United States Patent [19]

Tedeschi et al.

[11] Patent Number: 4,844,972

[45] Date of Patent: Jul. 4, 1989

[54] WOVEN-BACKED VINYL DECORATIVE-COVERINGS WITH STARCHY-PVA PREPASTE ADHESIVE

[75] Inventors: Vincent Tedeschi, Cresshill, N.J.; Dwight E. Chapman, Columbus, Ohio

[73] Assignee: Borden, Inc., Columbus, Ohio

[21] Appl. No.: 137,161

[22] Filed: Dec. 23, 1987

[51] Int. Cl.$^4$ .............................................. B32B 7/00
[52] U.S. Cl. ...................................... 428/246; 156/71; 156/305; 428/247; 428/251; 428/252; 428/480; 428/500; 428/532
[58] Field of Search ............... 428/246, 247, 251, 252, 428/480, 500, 532, 904.4; 524/47, 48, 51; 156/71, 305

[56] References Cited

U.S. PATENT DOCUMENTS

| | | | |
|---|---|---|---|
| 2,215,848 | 9/1940 | Bauer | 91/68 |
| 2,383,637 | 9/1945 | Yates et al. | 283/62 |
| 2,424,546 | 7/1947 | Bauer et al. | 117/122 |
| 2,477,344 | 7/1949 | Neumann | 117/122 |
| 2,746,881 | 5/1956 | Wegener | 117/76 |
| 2,768,096 | 10/1956 | Toulmin, Jr. | 117/122 |
| 3,200,094 | 8/1965 | Sederlund et al. | 260/29.6 |
| 3,202,539 | 8/1965 | Holt, Jr. et al. | 117/122 |
| 3,212,924 | 10/1965 | Asnes | 117/122 |
| 3,212,957 | 10/1965 | Linda et al. | 161/167 |
| 3,525,850 | 8/1970 | Hager, Jr. | 219/357 |
| 3,574,656 | 4/1971 | Sauntson et al. | 117/6 |
| 3,616,146 | 10/1971 | Gabet | 161/88 |
| 3,654,067 | 4/1972 | Klein | 161/216 |
| 3,696,065 | 10/1972 | Hoffman et al. | 260/17.4 ST |
| 3,810,783 | 5/1974 | Bomball | 117/122 S |
| 4,355,073 | 10/1982 | Knightly | 428/350 |
| 4,355,074 | 10/1982 | Stemmler et al. | 428/350 |
| 4,361,452 | 11/1982 | Clarke et al. | 156/71 |
| 4,460,643 | 7/1984 | Stevens et al. | 428/284 |
| 4,650,704 | 3/1987 | Rothenberg | 428/40 |

OTHER PUBLICATIONS

Columbus Coated Fabrics, "Match Makers in Pre-pasted Wall-tex," 4th Ed., (circa. 1962).

*Primary Examiner*—Marion C. McCamish
*Attorney, Agent, or Firm*—Dennis H. Rainear; Kenneth P. Van Wyck

[57] ABSTRACT

Woven-backed vinyl coverings with starchy-PVA adhesive are readily applicable by "do-it-yourselfers" to interior walls and ceilings, cabinets, other appropriate furniture, and so forth, and are long-lasting when so applied. These coverings are fully strippable.

14 Claims, No Drawings

WOVEN-BACKED VINYL DECORATIVE-COVERINGS WITH STARCHY-PVA PREPASTE ADHESIVE

FIELD

This invention concerns prepasted woven-backed vinyl coverings and appropriate adhesives therefor, with procedures, i.e., method(s) or process(es), for preparation and use of same. Such coverings are generally useful for decoratively protecting such surfaces as interior walls and ceilings, cabinetry, other appropriate furniture surfaces and so forth.

BACKGROUND

Originally, wallcoverings were simply paper printed with a design and suited for being pasted to a wall or other surface for decorative purposes. In the 1920's vinyl wallcover was introduced which had a backing of woven fabric, i.e., scrim, that not only facilitated hanging of the paper, but also provided strippability characteristics not previously provided by the printed papers. Unfortunately, such fabric backed vinyl wallcover was substantially more expensive than the simple printed paper and exhibited physical disadvantages relating to permeability and adhesion. Subsequently, wallcover manufacturers began to use paper and then nonwoven material as backing for their vinyl wallcover products. See e.g., Stevens et al., U.S. Pat. No. 4,460,643 (July 17, 1984).

However, woven-backed vinyl wallcoverings in general are more desirable to employ than the paper and nonwoven backed vinyl wallcoverings because primarily they have greater durability, for instance, as observable as increased tear resistance, and as good washability, and secondarily they have potentially enhanced aesthetic capability, for instance, as observable as an appropriately more striking and deeper three-dimensional embossing, therewith. Also, such wallcoverings as the paper-backed wallcoverings may be perceived as being "cheap" by consumers.

Moreover, proper pasting especially by do-it-yourselfers can be most critically related to the vinyl wallcovering adhesive itself. One of the necessary properties of the adhesive for such application is capability of adhesive capacity retention even after a long soak-time. A second and highly important requirement for the prepasted wallcovering adhesive is slip. A third requirement is the relative ease of removal of the wallcovering, i.e., its strippability. Cost of the adhesive is of practical concern also. See e.g., Bomball, U.S. Pat. No. 3,810,783(May 14, 1974).

Nonetheless, introduction of acceptable woven-backed vinyl wallcoverings has been met with failure by others even somewhat recently. This is particularly so with respect to prepasted do-it-yourself type woven-backed vinyl wallcoverings, which have been beset with significant difficulties to include poor technical performance.

Accordingly, the problems are truly not so simple that they may be overcome merely by employing an ordinary adhesive. See, e.g., Bauer et al., U.S. Pat. No. 2,424,546 (July 29, 1947). This is particularly so with respect to providing a good prepasted woven-backed vinyl covering for interior walls and so forth.

SUMMARY

The present invention provides so-called "woven-backed vinyl decorative-coverings with starchy-PVA prepaste adhesive," with procedures for preparation and use of same. These coverings are generally useful for decoratively protecting such interior surfaces as walls and ceilings, cabinetry, other appropriate furniture surfaces, and so forth and are particularly useful for do-it-yourself application. Moreover, the invention accordingly provides a so-called "starchy-PVA prepaste adhesive," with procedures and use of same as well. This adhesive is especially suitable for employment in the covering of the invention.

Overcome thereby are numerous such problems and difficulties heretofore known in the art, especially as aforesaid. More than satisfied thereby are such pasting considerations especially as aforesaid. Moreover, the advantages of prepasting are incorporated with the advantages of a good, durable and aesthetically pleasing vinyl wallcovering, and thus, highly significant progress in the art is provided.

DETAIL

Woven-backed vinyl decorative-coverings sans adhesive, i.e., generally without adhesive, can be provided by known methods. See, Stevens et al., supra. These coverings are advantageously 3-ply: (1) vinyl sheet, (2) plastisol adhesive, and (3) scrim. However, some manufacturers press the scrim directly into the vinyl sheet without employment of the plastisol adhesive. Nonetheless, it is desirable to provide a woven-backed vinyl covering for adhesive application thereto with, in general, approximately one-third to two-thirds of its scrim exposed, i.e., not imbedded in the vinyl or plastisol portion thereof, and more desirably so, with about one-half of its scrim exposed.

The scrim portion thereof must be of suitable construction. As an illustration, scrim having a density about from 0.75 to 1.5 ounces avoirdupois per square yard, i.e., oz./sq. yd., of fiber-bundles therein is generally suitable, and scrim having about from 0.9 to 1.3 oz./sq. yd. of fiber-bundles therein is more desirably employed, with approximately 1.1 oz./sq. yd. preferred, in the practice of the invention. Higher or lower weight value scrims may have unsuitable adhesive properties, especially within the warp and fill parameters which follow. Of less criticality than the foregoing density, scrim having a warp and fill separately at each occurrence about from 25×15 to 40×30 fiber-bundles per inch, i.e., fiber-bundles/in. is generally suitable, and scrim having a warp and fill separately at each occurrence about from 30×20 to 35×25 fiber-bundles/in. is more desirably employed, with approximately 32×22 fiber-bundles per inch preferred, in the practice of the invention. Higher warp and fill numbers generally yield stiffer, less easily manageable coverings, and lower warp and fill values generally provide less desirable adhesive capabilities. Furthermore, the fiber-bundles should be composed of a material which is capable of adsorbing or even desirably absorbing the starchy-PVA adhesive. Illustratively thus, such fiber-bundles as, for example, cotton and/or cotton/polyester blend fiber-bundles, especially with warp fiber-bundles of a 50/50 ratio by weight cotton/polyester fiber blend and fill fiber-bundles of cotton, and so forth and the like are suitably employable in the practice of the invention.

Amounts of vinyl applied to the scrim may vary appropriately. In general, amounts of vinyl about from 4 to 12 ounces avoirdupois per square inch, i.e., oz./sq. in., are suitably employed, and amounts of vinyl about from 5 to 8 oz./sq. in. are more desirably employed, with approximately 6.4 oz./sq. in. preferred, in the practice of the invention.

The following table lists generally suitable approximate ranges for the vinyl applied to the scrim in units of parts per hundred parts by weight, i.e., pphp, of the vinyl resin.

| Component | Desirable | More Desirable | Exemplary |
|---|---|---|---|
| Vinyl resin | (100) | (100) | (100) |
| Plasticizer | 10–100 | 20–40 | 27 |
| Heat Stabilizer | 0.1–10 | 3–5 | 4 |
| V-Filler | 0–100 | 30–70 | 53 |
| Process Aid | 0–5 | 0.1–2 | 0.5 |
| Flame Retardant | 0–10 | 1–3 | 2 |

Preferably: the vinyl resin contains a polyvinyl chloride resin, which may further contain an acrylic resin, and so forth and the like; the plasticizer is either a phthalate-type plasticizer, for example, dioctyl phthalate, or is a phthalate-type employed in conjunction with a polyether oil-type plasticizer, wherein the polyether oil-type portion thereof is generally used in lieu of phthalate-type plasticizer and may appropriately be present desirably at 0–5 pphp levels, more desirably at 0.5–4 pphp levels, and for example, being 25 pphp diisononylphthalate with 2 pphp epoxidized soybean oil; the heat stabilizer is such a metalcontaining composition as one containing Sn, Ba, Cd and/or Zn in liquid media, for example, one containing Ba, Cd and Zn as in Thermcheck 6205 (Ferro); the V-filler is one such as clays, titanium dioxide, such a carbonate as, for example, calcium carbonate, and so forth; the process aid is such a mold-release agent as a polyethylene wax, such a carboxylic acid as, for example, stearic acid, and so forth, and the flame retardant is such a one as in phosphorus-containing, barium-containing or antimony-containing compounds and compositions, for example, barium metaborate or especially antimony trioxide. Other minor ingredients, for example, a mildewicide colorants, and so forth, may be added thereto as desired.

Although the term "vinyl" is employed herein, other suitable resins beyond vinyl-containing resins themselves may be employed in lieu of vinyl resins per se in the practice of the invention. Examples of same may include polyethylenes, and other resilient-type resin sheets. These other suitable resins can have scrim attached thereto by methods known in the art in order to have the starchy-PVA prepaste adhesive applied thereto in the practice of the invention. Nonetheless, the term "vinyl" is retained as inclusive of these unless otherwise specified.

The starchy-PVA prepaste adhesive in general contains a suitable starchy-type component, a polyvinyl acetate-containing polymer or the like, i.e., PVA-type polymer, and further components as desired. Examples of suitable starchy-type components include starches, oxidized starches, ethylated starches, dextrins, and so forth. "Polymer" herein includes homopolymers, copolymers, tripolymers,, and so forth. Examples of suitable PVA-type polymers include polyvinyl acetate homopolymer resin aqueous emulsions, acrylic resin aqueous emulsions, vinyl acetate/acrylate copolymer aqueous emulsions, vinyl acetate/ethylene copolymer resin aqueous emulsions, vinyl acetate/maleate copolymer resin aqueous emulsions, and so forth.

The following table lists generally suitable approximate ranges for starchy-PVA prepaste adhesive ingredients which can be present for formulation for application to wovenbacked vinyl coverings in manufacturing the coverings of the invention. Percentages are by weight.

| Component | Desirable | More Desirable |
|---|---|---|
| Starch-type | 5–40% | 10–20% |
| PVA-type | 0.1–30% | 5–10% |
| Free Water | 40–80% | 30–70% |
| Humectants | | |
| urea-type | 0–25% | 5–15% |
| sugar-type | 0–10% | 1–7% |
| Filler | 0–25% | 5–15% |
| Defoamer | | |
| glycol-type | 0–10% | 0.1–0.3% |
| oil-type | 0–5% | 0.05–0.2% |
| Preservative | | |
| bacteriostat | 0–1% | 0.01–0.5% |
| fungicide | 0–1% | 0.01–0.5% |
| Dispersing agent | 0–1% | 0.5–0.5% |

Amounts of these components are calculated based upon any presence of the free water. The free water is that water which can evaporate under ambient conditions.

Percentages may be calculated on the basis of "exclusive of any free water." These percentages do not take into account free water and are thus based upon the remaining components. For example, if free water is present at 60.00 percent by weight, and the starch-type component is 14.50 percent by weight therein, there is 36.25 percent by weight starch-type component exclusive of any free water.

Preferably: the starch is a modified waxy maize, for example, Amaizo 835 (American Maize), or the like; the PVA is a polyvinyl acetate homopolymer, for example, Polyco 571 (Rohm-Hass Chemical Co.), or the like; the urea-type humectant is, for example, urea; the sugar-type humectant is a sugar or sugar derivative, for example, sucrose or corn sugar; the filler is such a finely-divided inert composition as kaolins, clays, talc, titanium dioxide, carbonates or silicates, typically with average particle diameters about from 0.1 to 1 micron, for example, about 0.55 micron average diameter aluminum silicate such as in Clay ASP-200 (Engelhardt Mineral & Chemical Co.); the glycol-type defoamer is a polypropylene glycol, for example, Polyglycol P-200 (Dow Chemical Co.); the oil-type defoamer is such an oil as corn oil and so forth, or a mineral oil, for example, Colloid 581 D (Colloid, Inc.); the bacteriostat is one or so of many known in the art, which may be 1,2-dibromo-2,4-dicyanobutane, for example, as found in Tektamer 38AD (Merck & Co., Inc.); the fungicide is one or so of many known in the art, especially as active against mildew such as with 2-(4-thiazolyl)benzimidazole, for example, as found in Metasol TK100WD (Merck & Co., Inc.), and the dispersing agent is any employable such agent known in the art, illustratively, a water-soluble salt of a polymerized alkyl naphthalene sulfonic acid, for example, such as the sodium salt thereof as found in Darvan No. 1 (R. T. Vanderbit Co.). Silicone-containing dispersants are typically not employed due to generally poorer adhesion therewith. Also other humectant(s) can be employed such as glycine, glycerine, CaCl₂, NaNO₃, NaCl and so forth. Further appropriate ingredients may be present as desired.

The starchy-PVA prepaste adhesive components generally are combined by procedures known in the art in order to provide the starchy-PVA prepaste adhesive. Suitably, the starch-type with sugar-type component(s), any filler, humectant(s) and dispersing agent(s), defoamers component(s), and the like, are mixed with water and heated, desirably to about from 60° C. to 100° C., more desirably to about from 70° C. to 90° C., and for example, to approximately 85° C., for to about from 5 minutes to 2 hours, more desirably about from 10 minutes to an hour, and for example, for approximately 15 to 30 minutes time. The mixture is next cooled, desirably about from 15° C. to 40° C., and for example, to approximately 40 to 50° C., whereupon the PVA-type and any remaining desired component(s) is(are) mixed appropriately until a generally homogenous mixture is obtained. Alternatively, it may be desired to add the urea-type components(s) lastly an appropriately additionally heat the entire mixture afterwards in order to minimize any propensity for such components(s) to thermally decompose. This provides the starchy-PVA prepaste adhesive in a liquid, manufacturing-capable form.

A solvent may also be added to the liquid adhesive in order to help flash away water during any drying the adhesive of the invention. Examples of such solvents include acetone, methanol, ethanol, propanols and so forth and the like.

The liquid starchy-PVA prepaste adhesive can be suitably applied to the appropriate woven-backed vinyl decorative-covering. Known procedures can be generally employed. However, a most suitable procedure employs roller coating with subsequent drying in a hotbox, which has steam heated coils and a low air draft therein. Suitable hotbox drying conditions include temperatures about from 90°C to 150° C., for example, approximately 130° C., and up to about 5 minutes drying time, for example, approximately 1 minute drying time. Other drying procedures may be used. See e.g., Hager, Jr., U.S. Pat. No. 3,525,850 (Aug. 25, 1970). Doctor-knife and forced air oven procedures are best avoided because of poorer quality product generally afforded thereby. Upon drying, the moisture content of the starchy-PVA adhesive applied to the covering is typically less than about 5 percent by weight. The dry adhesive desirably has so-called non-blocking properties. Dry weights of the starchy-PVA prepaste adhesive on the final dried product are desirably about from 1.8 to 2.7 ounces avoirdupois per square yard, i.e., oz./sq. yd., with a preferred range about from 2.1 to 2.5 oz/sq. yd. and a target value of approximately 2.3 oz/sq. yd. The binding capability of the adhesive of the invention when appropriately applied to an interior surface should be about from 6 to 20 or so ounces avoirdupois per linear inch, i.e., oz./ln. in., and advantageously about from about 15 to 18 oz./ln. in., when appropriately applied. The coverings of the invention are long-lasting in adhesive effect.

The thus-manufactured woven-backed vinyl decorativecovering with starchy-PVA adhesive can be cut and rolled as desired for shipment. Preferably, rolls are about from 20 to 27 or so inches wide by about 9 to 11 or so yards, long with the decorative surface facing outwardly.

The woven-backed vinyl decorative-covering with starchyPVA prepaste adhesive is applied by known procedures to an appropriate surface, which is generally an interior surface. The do-it-yourselfer typically soaks a roll of the covering of the invention in a large vessel, which is advantageously a bathtub or large bucket or trough, which holds tap water at a cool to warm temperature, for approximately a minute, pulls on an exposed end of the roll, thereby allowing the roll to unwind in the water while it is being pulled out, and applies it to the surface to be covered, paste side down. Then, the covering of the invention is readily slipped into place. A subsequent stiff-brushing or wet-sponging of the thus-applied covering of the invention may be employed to remove any trapped air bubbles and to remove any adhesive residue on its visible surface. The so-applied coverings of the invention are allowed to dry at ambient conditions.

The woven-backed vinyl decorative-coverings with starchy-PVA prepaste adhesive are fully strippable. Thus, removal of adhered coverings of the invention from the underlying surface can generally be accomplished dry. The covering of the invention is merely pulled therefrom. Preferably, the interior surface had been appropriately primed with an alkyd- or latex-type primer prior to applying the covering of the invention in order to further aid in the fully strippability.

The following example further illustrates the invention. Parts and percentages therein are by weight.

EXAMPLE

The following ingredients are separately thoroughly mixed with stirring into 5500 pounds, i.e., lbs., water: 1450 lbs. Amaizo 835; 950 lbs. Clay ASP-200; 925 lbs. urea; 325 lbs. sucrose; 20 lbs. Polyglycol P-1200, and 10 lbs. Darvan No. 1. The mixture is heated with stirring for 15 minutes at 85° C., and is thereafter cooled to 45°–50°C, whereupon the following ingredients are separately added with stirring: 750 lbs. Polyco 571; 10 lbs. Colloid 581D; 20 lbs. Tektamer 38 AD; 10 lbs. Metasol TK100WD; and sufficient water to make up 10,000 lbs. total composition. The composition is further stirred thoroughly until a homogenous mixture is obtained. A white, bland starchy-PVA prepaste adhesive in manufacturing-capable form results, which is storage stable at 70° F. (21° C.) for at least 3 or so months. The adhesive has about 60 percent free water.

This adhesive is applied by roller coating to the scrim side of 5000 yards of 7.0 oz./sq. yd. woven-backed vinyl per se wallcovering (initially sans adhesive). The scrim is 1.1 oz./sq. yd. scrim with a 32×22 warp and fill, the warp being a 50/50 blend of cotton and polyester and the fill being cotton, nd about one-half of the scrim is exposed. This wallcovering of the invention is dried in a hotbox at 130° C. for one minute. The dry adhesive is non-blocking. The free water content of the adhesive is less than 5 percent of the adhesive portion of the wallcovering, and the adhesive is thus present at 2.3 oz./sq. yd. The wallcovering is cut and is rolled.

Samples of this wallcovering are delivered to 30 consumers, who soak the wallcovering in cool to warm temperature water for one minute, and apply it, with appropriate brushing and sponging, to such various surfaces as interior walls and so forth. All consumers regard the product as being high quality and easy to apply, with easy clean-up. The wallcovering is fully strippable.

Conclusion

Woven-backed vinyl decorative-coverings with starchy-PVA prepaste adhesive are thus provided. Numerous modifications thereof can be accomplished by those skilled in the art within the spirit and scope of this invention and as particularly pointed out by the following distinctly claimed subject matter.

What is claimed is:

1. A woven-backed vinyl decorative-covering having a starchy-PVA prepaste adhesive applied to a scrim portion of the woven back to provide retention of adhesive capacity after soaking, slip and strippability, wherein said adhesive comprises a starch, an aqueous emulsion of a polyvinyl acetate-containing polymer selected from the group consisting of polyvinyl acetate homopolymers and copolymers of vinyl acetate with ethylene or derivatives of acrylic or maleic acids, at least one humectant, a filler, at least one defoamer, a preservative and a dispersing agent.

2. The covering of claim 1 having a scrim portion with a density about from 0.75 to about 1.5 oz./sq. yd.

3. The covering of claim 1 wherein said polyvinyl acetate-containing polymer is a polyvinyl acetate homopolymer, said humectant is selected from urea-type and sugar-type humectants, said defoamer is selected from glycol-type and oil-type defoamers, said preservative includes a bacteriostat and a fungicide and said dispersing agent comprises a sodium salt of a polymerized alkyl naphthalene sulfonic acid.

4. The covering of claim 1, wherein the dry weight of said adhesive on the product is in the range of from about 1.8 to 2.7 ounces avoirdupois per square yard.

5. A woven-backed vinyl decorative covering having a starchy-PVA prepaste adhesive applied to a scrim portion of the woven back to provide retention of adhesive capacity after soaking, slip and strippability, wherein said adhesive consists essentially of a modified waxy maize starch, an aqueous emulsion of a polyvinyl acetate homopolymer, a humectant comprising sugar and urea, a filler comprising an aluminum silicate, a defoamer comprising a glycol and an oil, a preservative comprising a bacteriostat and a fungicide, and a dispersing agent comprising a sodium salt of a polymerized alkyl naphthalene sulfonic acid.

6. The covering of claim 5 wherein the modified waxy maize ids present at approximately 36 percent; the polyvinyl acetate homopolymer is present at approximately 19 percent; the aluminum silicate is present at approximately 23 percent; the glycol-type defoamer is a polypropylene glycol present at approximately 0.5 percent; the oil-type defoamer is a mineral oil present at approximately 0.5 percent; the bacteriostat contains 1,2-dibromo-2,4-dicyanobutane; the fungicide contains 2-(4-thiazolyl)benzimidazole, said percents being by weight exclusive of any free water, and the vinyl is polyvinyl chloride.

7. A starchy-PVA prepaste adhesive comprising a starch, an aqueous emulsion of a polyvinyl-acetate-containing polymer selected from the group consisting of polyvinyl acetate homopolymers and copolymers of vinyl acetate with ethylene or derivatives of acrylic or maleic acids, at least one humectant, a filler, at least one defoamer, a preservative and a dispersing agent.

8. The adhesive of claim 7, wherein said polyvinyl acetate-containing polymer is a polyvinyl acetate homopolymer, said humectant is selected from urea-type and sugar-type humectants, said defoamer is selected from glycol-type and oil-type defoamers, said preservative includes a bacteriostat and a fungicide and said dispersing agent comprises a sodium salt of a polymerized alkyl naphthalene sulfonic acid.

9. The adhesive of claim 8 wherein the modified waxy maize is present at approximately 36 percent; the polyvinyl acetate homopolymer is present at approximately 19 percent; the aluminum silicate is present at approximately 23 percent; a glycol-type defoamer is present and is a polypropylene glycol present at approximately 0.5 percent; an oil-type defoamer is present and is a mineral oil present at approximately 0.5 percent; the bacteriostat contains 1,2-dibromo-2,4-dicyanobutane; and the fungicide contains 2-(4-thiazolyl)benzimidazole, said percents being by weight exclusive of any free water.

10. The adhesive of claim 7, 8 or 9 further comprising free water about from 40 to 80 percent by weight of the total adhesive.

11. The adhesive of claim 9 further comprising free water at approximately 60 percent by weight of the total adhesive.

12. A method for preparing woven-backed vinyl decorative-covering with starchy-PVA prepaste adhesive comprising contacting a scrim portion of an appropriate woven-backed vinyl decorative-covering with a starchy PVA prepaste adhesive comprising a starch, an aqueous emulsion of a polyvinyl acetate-containing polymer, at least one humectant, a filler, at least one defoamer, a preservative and a dispersing agent under conditions including roller coating and hot box drying such that the woven-backed vinyl decorative-covering with starch-PVA prepaste adhesive is prepared.

13. The method of claim 12 wherein roller coating with hotbox drying is employed.

14. A method for using woven-backed vinyl decorative-covering with a starchy-PVA prepaste adhesive comprising a starch, an aqueous emulsion of a polyvinyl acetate-containing polymer, at least one humectant, a filler, at least one defoamer, a preservative and a dispersing agent, said method comprising steps of wetting the adhesive of said covering and contacting the wet adhesive of said covering with a surface under conditions such that said covering is applied to the surface.

* * * * *